United States Patent [19]

Wills

[11] 3,855,482

[45] Dec. 17, 1974

[54] SOLID STATE SWITCHING SYSTEM FOR COUPLING AN AC POWER SUPPLY TO A LOAD

[75] Inventor: Frank E. Wills, York, Pa.

[73] Assignee: Borg-Warner Corporation, Chicago, Ill.

[22] Filed: Sept. 5, 1972

[21] Appl. No.: 285,960

[52] U.S. Cl. ...... 307/252 B, 307/252 N, 307/252 T
[51] Int. Cl. ........................................... H03k 17/72
[58] Field of Search ............ 307/252 B, 252 N, 133

[56] References Cited

UNITED STATES PATENTS

| | | | |
|---|---|---|---|
| 3,418,497 | 12/1968 | Sauter et al. | 307/252 N |
| 3,450,891 | 6/1969 | Riley | 307/252 B |
| 3,619,653 | 11/1971 | Poppinger | 307/252 B |
| 3,621,294 | 11/1971 | Cliff | 307/252 N |
| 3,656,005 | 4/1972 | Lee | 307/252 B |
| 3,746,887 | 7/1973 | Lorenz | 307/252 B |

*Primary Examiner*—John S. Heyman
*Attorney, Agent, or Firm*—Donald W. Banner

[57] ABSTRACT

An AC power supply is coupled to a load via a series-connected triac triggered into conduction at the beginning of each alternation or half cycle by bidirectional gate current derived from the power supply itself. The triggering circuit includes a series-connected electronic switch having a complementary pair of parallel-connected transistors. Control of the power supply coupling to the load is achieved by controlling the bias of the transistors. When forward biased, the triggering circuit is made operable and the transistors conduct in alternation to permit the gate current to change direction each time the power supply voltage changes polarity.

1 Claim, 1 Drawing Figure

PATENTED DEC 17 1974 3,855,482
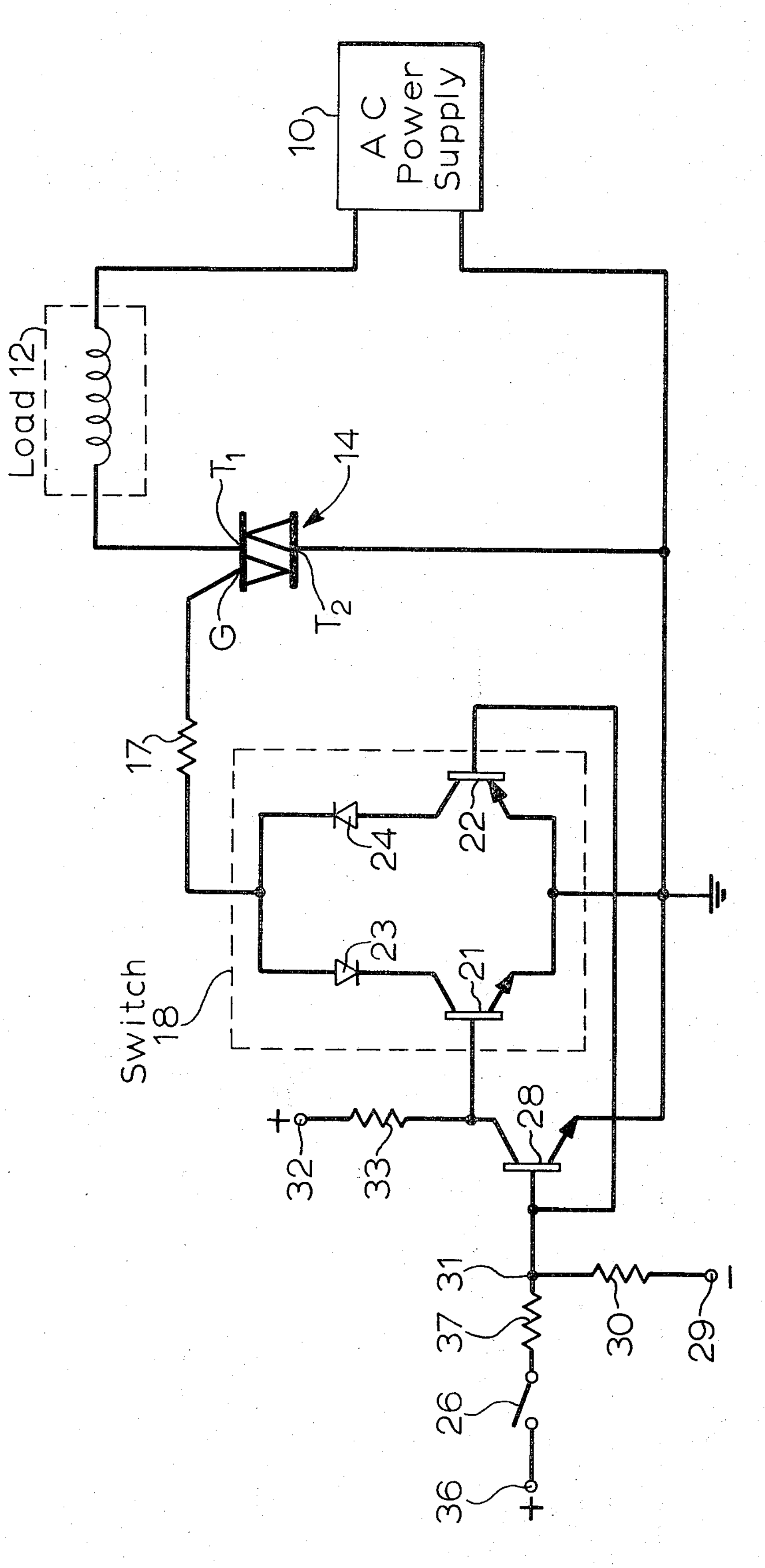

SOLID STATE SWITCHING SYSTEM FOR COUPLING AN AC POWER SUPPLY TO A LOAD

BACKGROUND OF THE INVENTION

Solid state switching systems developed heretofore for controlling power delivery to industrial loads are generally inefficient and consume a substantial amount of power themselves in the process of triggering their semiconductor switching devices (usually thyristors such as silicon controlled rectifiers or triacs) into conduction, the conducting devices serving as closed series switches through which the power sources are coupled to the loads. Since most industrial loads are inductive, the use of pulse triggering is prohibited. Direct current from a DC potential source is therefore customarily employed to turn ON each semiconductor when power is to be supplied to a load. Unfortunately, such DC triggering or gate current presents a considerable load on the DC power supply and this is particularly troublesome when the triggering circuit is to be interfaced with and controlled by low-power solid state logic circuitry. When the triggering current is drawn from the logic circuitry, that circuitry will be appreciably loaded to the extent that its entire operation is deleteriously affected.

The present invention constitutes a significant improvement over prior solid state switching arrangements for AC power supplies since it consumes relatively little power and is highly efficient. Moreover, it derives no triggering current from, and thus does not load, any control circuit for the switching arrangement. And yet, its construction is relatively simple and inexpensive.

SUMMARY OF THE INVENTION

The solid state switching system of the invention controls the application to a load of an alternating voltage provided by a two-terminal AC power supply. It comprises a bidirectional semiconductor switching device, such as a triac, having first and second main terminals and a control or gate terminal, There are means for connecting one of the power supply terminals through the load to the first main terminal and for connecting the other power supply terminal directly to the second main terminal. A triggering circuit is coupled between the control terminal and the second main terminal and this circuit includes a series-connected electronic switch having a complementary pair of parallel-connected transistors. The switching system also comprises control means for establishing and maintaining the transistors forward biased to permit conduction thereof in alternation in response to polarity changes of the alternating voltage in order to close the electronic switch and effect bidirectional current flow between the control terminal and the second main terminal to trigger the semiconductor switching device into conduction at the beginning of each half cycle of the alternating voltage. As a result, that voltage is effectively continuously applied to the load via the conducting device while at the same time the bidirectional triggering current for the device is derived entirely from the AC power supply so that no loading is placed on the control means.

DESCRIPTION OF THE DRAWING

The features of the invention which are believed to be novel are set forth with particularity in the appended claims. The invention, together with further advantages and features thereof, may best be understood, however, by reference to the following description in conjunction with the accompanying drawing which schematically illustrates a switching system, constructed in accordance with the invention, and the manner in which the system couples an AC power supply to a load.

DESCRIPTION OF THE ILLUSTRATED EMBODIMENT

Block 10 represents a conventional two-terminal AC power supply providing an alternating voltage (varying in sinusoidal fashion) having a magnitude of 120 volts RMS and a commutating frequency of 60 cycles per second or hertz. This AC voltage, or what is commonly called line voltage, is applied to load 12 through the series-connected bidirectional or bilateral semiconductor switching device 14 which preferably takes the form of a triac having first and second main terminals, labeled $T_1$ and $T_2$ respectively, and a control or gate terminal G.

A triac may be considered as two parallel PNPN structures oriented in opposite directions to provide symmetrical bidirectional electrical characteristics to permit current flow between the main terminals in either direction. It operates basically as two silicon controlled rectifiers or SCR's connected in parallel, but with the anode and cathode of one SCR connected to the cathode and anode, respectively, of the other SCR. In the absence of any applied voltages, a triac assumes its OFF condition in which a very high impedance exists between main terminals $T_1$ and $T_2$ to effectively constitute an open switch. When a voltage of either polarity is subsequently impressed across the main terminals, the triac will remain non-conductive until triggering current of appropriate magnitude is made to flow between terminals G and $T_2$ in either direction, whereupon the triac turns ON to permit current flow between terminals $T_1$ and $T_2$ in response to the voltage applied thereto and in the direction determined by the voltage's polarity. Once the triac is rendered conductive, a very low impedance is presented between its main terminals so that it essentially functions as a closed switch. Conduction will continue even after the termination of the triggering current so long as there is a potential difference across the main terminals.

If the $T_1$–$T_2$ voltage is then reduced to zero, the triac returns to its OFF state. Thereafter, if the voltage across the main terminals is increased from zero, conduction will not occur until triggering current again flows between gate G and terminal $T_2$. When a triac is to conduct during substantially the entirety of an alternating voltage applied across its main terminals, triggering current must be supplied to the gate either continuously or at least at the beginning of each half cycle or alternation since the triac automatically switches to its OFF condition each time the applied alternating voltage crosses its a.c. axis, at which time a zero potential difference exists between terminals $T_1$ and $T_2$. In other words, at the end of each half cycle of one polarity the triac assumes its non-conductive state. The polarity of the alternating voltage then changes at the start of the next half cycle thereby requiring retriggering at the gate before $T_1$–$T_2$ current flow may take place.

Returning now to the illustrated embodiment, load 12, to which power supply 10 may be coupled, is shown specifically as an inductance. This has been done inasmuch as the present invention is most advantageous when employed with industrial loads which are usually inductive as mentioned previously. Of course, the load may take any form and may include resistance and/or capacitances.

Resistor 17 and series-connected bilateral electronic switch 18 provide a triggering circuit coupled between gate terminal G and main terminal $T_2$. Switch 18 comprises the complementary pair of parallel-connected transistors 21, 22 and the pair of oppositely-poled diodes 23, 24. Control of electronic switch 18 is accomplished by the circuitry coupled to the bases of transistors 21 and 22. With manually operated switch 26 in its open position, as shown in the drawing, NPN transistor 28 is reverse biased and therefore cutoff by virtue of a negative voltage applied to the transistor's base from negative DC potential source 29 and through resistor 30 and circuit junction 31. With transistor 28 non-conducting, positive voltage from positive DC potential source 32 is applied through resistor 33 to the base of NPN transistor 21 to forward bias that transistor. At the same time, PNP transistor 22 is forward biased by the negative voltage at circuit junction 31 which is applied to the transistor's base.

Forward biasing of transistors 21 and 22 effectively closes electronic switch 18 since current will now flow through the switch anytime there is potential difference between terminals G and $T_2$. When the gate terminal is positive relative to terminal $T_2$, current flows through diode 23 and transistor 21 in the direction from the collector to the emitter of that transistor. At that time, transistor 22 and diode 24 will be non-conductive even though the transistor is forward biased. When the voltage between terminals G and $T_2$ changes polarity, transistor 22 and diode 24 conduct while transistor 21 and diode 23 become non-conductive.

Since switch 18 is thus bilateral or bidirectional, triggering or gate current will flow between control terminal G and main terminal $T_2$ to fire triac 14 into conduction at the beginning of each half cycle of the alternating line voltage developed by power supply 10. To explain, at the start of each half cycle when the upper output terminal of supply 10 becomes positive relative to the lower terminal, the full line voltage appears between terminals G and $T_2$ and triggering current proportional to that line voltage flows from gate terminal G through resistor 17, diode 23 and the collector-emitter conduction path of transistor 21 to main terminal $T_2$ to trigger the device into its conductive state, thereby to couple load 12 to the AC power supply. The triggering action usually requires only a few microseconds so effectively the power supply is connected to the load at the very beginning of each positive half cycle. Once the triac is turned ON the impedance between main terminals $T_1$ and $T_2$ will be very low and the voltage across those terminals will drop from full line voltage to saturation voltage, ordinarily about 1 volt. Hence, substantially the full line voltage is applied across load 12. At the same time, the gate current decreases to an insignificant value.

After the line voltage completes a positive half cycle and crosses its a.c. axis, transistor 21 switches to its non-conductive state. At that instant there is a zero potential difference across the output terminals of power supply 10 so both of transistors 21 and 22 will be turned OFF and switch 18 will be open. At the start of the immediately succeeding negative half cycle when the upper terminal of power supply 10 becomes negative as referenced to the lower terminal, the full line voltage again appears between gate G and terminal $T_2$ but now terminal $T_2$ will be positive with respect to terminal G as a result of which triggering current flows in the direction toward the gate and through the emitter-collector conduction path of transistor 22, diode 24 and resistor 17. Within a few microseconds the triggering current switches triac 14 to its ON state, whereupon substantially the full line voltage is impressed across load 12 and the gate current reduces to a negligible level as in the case of the previously described positive half cycle. These conditions prevail until the negative half cycle terminates and the next succeeding positive half cycle commences, at which time transistor 22 turns OFF and transistor 21 becomes conductive to initiate another cycle.

Resistor 17 is provided to limit the gate current to a level adequate to effect the necessary triggering within a few microseconds of the start of each half cycle. It also limits the triggering current after the triac turns ON. Diode 23 prevents current from flowing through the collector-base junction of transistor 21 during each negative voltage alternation, while diode 24 blocks current flow through the collector-base junction of transistor 22 during the positive half cycles.

Power supply 10 may be decoupled from load 12 merely by closing switch 26 which connects source 36 of positive DC potential to circuit junction 31 by way of resistor 37. Resistors 30 and 37 will now constitute a voltage divider between positive source 36 and negative source 29. The electrical sizes of those resistors and the levels of the two voltage sources will be appropriately selected so that circuit junction 31 will be sufficiently positive to forward bias transistor 28 and render it conductive. As a result, the collector voltage of transistor 28 decreases to a level appropriate to reverse bias transistor 21. Meanwhile, the positive voltage from junction 31 reverses biases transistor 22 so that both of the transistors in electronic switch 18 no longer can conduct, thereby opening the switch to disable the triggering circuit and prevent the triac from conducting.

It is apparent that the described switching system has many advantages. With the extremely fast triggering action, the alternating voltage from supply 10 may be effectively applied continuously to load 12 via the conducting triac. Due to the low duty cycle of the triggering current and also due to the fact that current flows through the load, the triggering scheme is highly efficient. Moreover, whatever triggering current is required is derived entirely from the main AC power supply itself so that no loading whatsoever is placed on the control circuitry coupled to the bases of transistors 21 and 22.

Of course, when logic circuitry is employed to control the transistors of switch 18, the function of switch 26 will be performed by an appropriate electronic switching scheme. Switch 26 is illustrated as a simple manually operated ON-OFF switch merely to simplify the disclosure. The invention is particularly attractive when low-power logic circuitry is used to control the triggering of triac 14 since that circuitry will not be loaded by the disclosed switching system.

The invention provides, therefore, an improved solid state switching system for interconnecting an AC power supply to a load via a series-connected bidirectional semiconductor switching device fired into conduction at the start of each alternation of the AC voltage from the supply by means of bidirectional triggering current derived from the power supply. Such triggering current is made possible by incorporating, in the triggering circuit, a series-connected electronic switch comprising a complementary pair of parallel-connected transistors which conduct in alternation.

While a particular embodiment of the invention has been shown and described, modifications may be made, and it is intended in the appended claims to cover all such modifications as may fall within the true spirit and scope of the invention.

I claim:

1. A solid state switching system for controlling the application to a load of an alternating voltage provided by a two-terminal AC power supply, comprising:

a triac having first and second main terminals and a gate terminal;

means for connecting one of the power supply terminals through the load to said first main terminal and for connecting the other power supply terminal directly to said second main terminal;

a triggering circuit coupled between said gate terminal and said second main terminal and including a series-connected resistor and a series-connected electronic switch having a complementary pair of parallel-connected transistors, the emitters of which are joined together and connected directly to said second main terminal, and in which the collectors of said transistors are connected through respective ones of a pair of oppositely-poled diodes to one terminal of said resistor, the other terminal of said resistor being connected to said gate terminal;

and control means for establishing and maintaining said transistors forward biased to permit conduction thereof in alternation in response to polarity changes of the alternating voltage in order to close said electronic switch and effect bidirectional current flow between said gate terminal and said second main terminal to trigger said triac into conduction at the beginning of each half cycle of the alternating voltage, thereby effectively applying that voltage continuously to the load via the conducting triac while at the same time deriving the bidirectional triggering current entirely from the AC power supply so that no loading is placed on said control means.

* * * * *